United States Patent
Warnecke et al.

(10) Patent No.: US 10,598,271 B2
(45) Date of Patent: Mar. 24, 2020

(54) OIL PUMP CONFIGURATION FOR A MOTOR VEHICLE

(71) Applicant: Volkswagen Aktiengesellschaft, Wolfsburg (DE)

(72) Inventors: Raimar Warnecke, Schwülper (DE); Waldemar Knoll, Dollbergen (DE); Ralf Sprenger, Gifhorn (DE); Holger Tagge, Braunschweig (DE); Karsten Cornelsen, Braunschweig (DE); Thomas Birnbaum, Braunschweig (DE); Frank Müller, Essenrode (DE); Bernd Morthorst, Braunschweig (DE); Henning Wöhl-Bruhn, Cremlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 227 days.

(21) Appl. No.: 15/638,645

(22) Filed: Jun. 30, 2017

(65) Prior Publication Data

US 2017/0299047 A1    Oct. 19, 2017

Related U.S. Application Data

(63) Continuation of application No. PCT/EP2016/000047, filed on Jan. 13, 2016.

(30) Foreign Application Priority Data

Jan. 13, 2015    (DE) .................. 10 2015 200 317

(51) Int. Cl.
*F16H 57/04* (2010.01)
*F16H 61/00* (2006.01)
*F16H 57/02* (2012.01)

(52) U.S. Cl.
CPC ......... *F16H 57/0441* (2013.01); *F16H 57/02* (2013.01); *F16H 61/0031* (2013.01); *F16H 2057/02086* (2013.01)

(58) Field of Classification Search
CPC .. F16H 57/0441; F16H 57/04; F16H 61/0031; F16H 2057/02086
(Continued)

(56) References Cited

U.S. PATENT DOCUMENTS 5,026,263 A * 6/1991 Iwata .................. F01C 21/0863
418/268
5,474,428 A * 12/1995 Kimura ............... F16H 57/0439
192/48.92

(Continued)

FOREIGN PATENT DOCUMENTS

DE        4342233 A1    6/1994
DE    102005039868 A1    3/2006
(Continued)

OTHER PUBLICATIONS

Search Report including Provisional Assessment of Patentability issued by the German Patent and Trademark Office for German Patent Application No. DE 10 2015 200 317.5 dated Sep. 14, 2015.
(Continued)

*Primary Examiner* — Michael R Mansen
*Assistant Examiner* — Mark K Buse
(74) *Attorney, Agent, or Firm* — Manfred Beck, P.A.

(57) ABSTRACT

An oil pump configuration for a motor vehicle includes an oil pump having a pump part and an electric pump motor, wherein the pump part is operatively connected to the electric pump motor. The pump part and/or the electric pump motor can be mounted to a housing which at least partially delimits an oil chamber. Sealing problems at the pump part are prevented and the required installation space is low
(Continued)

because the pump part can be mounted inside the housing and the electric pump motor can be mounted from the outside to the housing.

18 Claims, 5 Drawing Sheets

(58) Field of Classification Search
USPC ........................................................ 184/6.28
See application file for complete search history.

(56) References Cited

U.S. PATENT DOCUMENTS

| | | | |
|---|---|---|---|
| 2006/0054445 | A1 | 3/2006 | Pashnik et al. |
| 2008/0286123 | A1* | 11/2008 | Yoshinami ............... F04C 2/102 417/118 |
| 2009/0057062 | A1* | 3/2009 | Eschenbeck ........ F16H 57/0441 184/6.28 |
| 2010/0320849 | A1* | 12/2010 | Wilton ..................... B60K 1/00 310/52 |
| 2012/0128513 | A1 | 5/2012 | Sakata et al. |
| 2012/0227394 | A1* | 9/2012 | Schweiher ............... B60K 6/48 60/488 |
| 2013/0199883 | A1* | 8/2013 | Akiba ................... F16D 25/082 192/48.609 |
| 2016/0160713 | A1* | 6/2016 | Reedy ..................... F01M 1/02 184/6.28 |
| 2016/0223070 | A1* | 8/2016 | Kito ......................... B60K 6/40 |
| 2019/0085970 | A1* | 3/2019 | Becka ................. F16H 57/0413 |

FOREIGN PATENT DOCUMENTS

| | | |
|---|---|---|
| DE | 102005013657 A1 | 9/2006 |
| DE | 102006012838 A1 | 11/2006 |
| DE | 102007018504 A1 | 10/2008 |
| DE | 102007041584 A1 | 3/2009 |
| DE | 102010002014 A1 | 8/2011 |
| DE | 112010005177 T5 | 10/2012 |
| EP | 1992846 A1 | 11/2008 |
| EP | 2497665 A2 | 9/2012 |
| EP | 2302264 B1 | 12/2012 |
| JP | 2005-299592 A | 10/2005 |
| JP | 2008-286108 A | 11/2008 |
| JP | 2011-032982 A | 2/2011 |
| JP | 2014-9676 A | 1/2014 |
| JP | 2014-183599 A | 9/2014 |

OTHER PUBLICATIONS

International Search Report for International Application No. PCT/EP2016/000047 and translation thereof, dated Jun. 7, 2016.
International Preliminary Report on Patentability for International Application No. PCT/EP2016/000047 including Written Opinion of the International Searching Authority and translation thereof, dated Jul. 18, 2017.
Notification of Reason for Refusal issued by the Korean Intellectual Property Office for Korean Application No. KR 10-2017-7022634 and translation thereof, dated Sep. 3, 2018.
Notification of Reason for Refusal issued by the Korean Intellectual Property Office for Korean Application No. KR 10-2017-7022634, which is related to U.S. Appl. No. 15/638,645, and translation thereof, dated May 2, 2019.

* cited by examiner

OIL PUMP CONFIGURATION FOR A MOTOR VEHICLE

CROSS-REFERENCE TO RELATED APPLICATIONS

This application is a continuation, under 35 U.S.C. § 120, of copending International Application No. PCT/EP2016/000047, filed Jan. 13, 2016, which designated the United States; this application also claims the priority, under 35 U.S.C. § 119, of German Patent Application No. DE 10 2015 200 317.5, filed Jan. 13, 2015; the prior applications are herewith incorporated by reference in their entirety.

BACKGROUND OF THE INVENTION

Field of the Invention

The invention relates to an oil pump configuration for a motor vehicle.

German Patent Application Publication No. DE 10 2007 018 504 A1 discloses an oil pump configuration for a transmission of a motor vehicle. A hydrodynamic pump part and an electric pump motor form an oil pump in the form of a motor-pump unit. This motor-pump unit is arranged in a transmission casing, in an oil bath below the oil level. Through the use of the pump part, the transmission oil is drawn into a pump inlet and conveyed from a pump outlet into a lubrication line and in parallel into a cooling branch. Via the lubrication line, lubrication points of the transmission are supplied with transmission oil. Through the cooling line, the operating medium reaches one or more injection nozzles through which the transmission oil reaches the transmission parts to be cooled. Then the transmission oil accumulates again in the transmission casing. In order to ensure the supply of transmission oil to the lubrication points at low temperatures, below a critical temperature limit the cooling line is closed by a shut-off device, so that the entire delivery quantity—greatly reduced at low temperatures—from the motor-pump unit reaches the lubrication points. In case of a failure of the electric motor, it is necessary to dismantle the transmission.

German Patent Application Publication No. DE 43 42 233 A1 describes an oil pump configuration for a transmission. The oil pump configuration has an oil pump with a pump part. The pump part can be coupled firstly via an output shaft to an internal combustion engine, and secondly to a pump motor in the form of an electric motor. The transmission has a first casing and a second casing which are connected to one another and form an oil chamber which contains a transmission mechanism, a differential gear mechanism and a pump part in the form of a gear oil pump. The gear oil pump has a pump housing, wherein the pump housing is attached on the inside to the first casing. Outside the second casing, an electric motor is arranged which is connected to the gear oil pump via a one-way coupling. The electric motor is arranged outside the oil chamber. The electric motor is arranged on the outside of the second casing. The second casing has a corresponding opening, wherein an output shaft of the electric motor passes through the opening and is connected to a drive shaft of the pump part via the one-way coupling. The external rotor and the internal rotor of the one-way coupling are lubricated via lubricating oil holes for the supply of lubricating oil. A motor control unit is connected to the electric motor via a plug. The motor control unit controls the supply of electrical energy for controlling the rotation of the electric motor. The gear oil pump can therefore be driven either by the electric motor or by the vehicle engine. A drive selection device selects the first force transmission path for driving the oil pump by the electric motor when the rotation speed of the output shaft of the vehicle engine lies below a predefined rotation speed, and selects the second force transfer path for driving the oil pump by the vehicle engine when the rotation speed of the output shaft of the vehicle engine exceeds the predefined rotation speed.

The generic European Patent Publication No. EP 2 302 264 B1 discloses an oil pump configuration for a transmission of a motor vehicle. A main oil pump is provided, wherein the main oil pump can be driven by an internal combustion engine of the motor vehicle. Furthermore, the oil pump configuration has an additional oil pump with a pump part and a pump motor in the form of an electric motor. The pump part and the pump motor form one unit. The additional oil pump is attached to a housing on the outside. The motor vehicle is equipped with a start-stop system. When the internal combustion engine is switched off the main oil pump no longer delivers. The additional oil pump now serves to supply a corresponding oil pressure to the clutches and/or actuators while the internal combustion engine has stopped. The main oil pump and the additional oil pump draw the oil from an oil tank through the use of an oil strainer. An oil pressure control device is arranged in the oil tank and is fed by both oil pumps, namely the additional oil pump and the main oil pump, Through the use of the oil pressure control device, the corresponding clutch is supplied with pressurized oil. The engine, a torque converter and a transmission are arranged transversely in a frontal region of the motor vehicle. The additional oil pump is arranged on the outside of a lateral end housing wall of the transmission. This housing wall points in the direction of one of the driven front wheels. This housing wall faces away from the torque converter and the engine, wherein the additional oil pump is arranged outside the region of the steered front wheel. An axle differential gear is arranged behind the transmission. The additional oil pump has a pump part, a pump motor and a control device, wherein these three components are arranged substantially vertically stacked above each other, wherein the pump part is at the top and the control unit at the bottom, and the pump motor is arranged in between. The pump part is here formed as a piston pump.

The generic oil pump configuration is not yet configured optimally. An additional oil pump mounted on the outside of the transmission casing requires additional ports, which may have sealing problems. Furthermore, this configuration requires additional installation space outside the transmission casing.

SUMMARY OF THE INVENTION

It is accordingly an object of the invention to configure and refine the oil pump configuration of the above-mentioned type such that sealing problems at the pump part are avoided and the installation space required is reduced.

This object on which the invention is based is achieved by an oil pump configuration defined in the accompanying claims.

With the foregoing and other objects in view there is provided, in accordance with the invention, an oil pump configuration for a motor vehicle transmission, including:

an oil pump having a pump part and an electric pump motor, the pump part being operatively connected to the electric pump motor; and a housing, the housing at least partially delimiting an oil chamber, the pump part being mountable inside the housing, the electric pump motor being mountable on the housing from outside.

In other words, according to the invention, there is provided an oil pump configuration for a motor vehicle transmission, including an oil pump having a pump part and an electric pump motor, wherein the pump part is in an operative connection with the pump motor, wherein the pump part and/or the pump motor can be mounted on a housing, wherein the housing at least partially delimits an oil chamber, and wherein the pump part can be mounted inside the housing and the pump motor can be mounted on the housing from the outside.

According to a further feature of the invention, the housing has a receiver; and the electric pump motor engages at least partially in the receiver.

According to another feature of the invention, the housing has a mounting wall delimiting the receiver, the mounting wall is formed with a passage opening, and the pump part is centered on an inner side of the mounting wall and the electric pump motor is centered on an outer side of the mounting wall.

According to a further feature of the invention, a control unit is disposed on the electric pump motor, and the control unit is sealed against the electric pump motor.

According to yet another feature of the invention, the housing has a receiver; the electric pump motor engages at least partially in the receiver; and the control unit is sealed against the receiver by at least a seal.

According to a further feature of the invention, the oil pump is disposed at a differential gear of the motor vehicle transmission.

According to another feature of the invention, an intermediate shaft is disposed in an articulated manner; and the pump part and the electric pump motor are joined to one another via the intermediate shaft.

According to another feature of the invention, the pump part is bolted to the housing such that the pump part performs a reinforcing function for the housing.

According to another feature of the invention, the housing has a rib, the rib is formed with a cutout at the pump part, wherein the pump part bridges the cutout.

In accordance with another feature of the invention, a main oil pump is functionally actively driven by an internal combustion engine, wherein the main oil pump is provided parallel to the oil pump in a hydraulic oil circuit.

According to another feature of the invention, a switchover valve is provided downstream of the oil pump, wherein in one switch position of the switchover valve, the oil pump feeds a mechatronic unit and in another switch position of the switchover valve, the oil pump feeds a cooling oil branch.

According to a further feature of the invention, the oil pump has an electrical power supply which is independent of a transmission control device.

According to another feature of the invention, an intake tract of the main oil pump can be charged by the oil pump.

According to yet another feature of the invention, the housing is configured as a clutch housing.

In accordance with another feature of the invention, the clutch housing forms a part of a transmission casing and/or at least partially seals the transmission casing.

The pump part can be mounted inside the housing and the pump motor can be mounted on the housing from the outside. Since the pump part is arranged in the oil chamber, sealing problems are avoided and the installation space required outside the housing is reduced. Furthermore, this embodiment has the advantage that the electric pump motor can easily be replaced from the outside. The housing is in particular configured as a clutch housing and in particular additionally also delimits a transmission chamber. The transmission need not therefore be dismantled in order to replace the pump motor. The pump part is in particular bolted to the clutch housing on the inside of the transmission.

The pump motor and the pump part are joined together by an intermediate shaft. The intermediate shaft is integrated in particular captively in the pump part. Preferably, the intermediate shaft is mounted not fixedly but in articulated fashion, which has the advantage that angular defects or angle errors between the pump motor and the pump part can be compensated, in the same way as by a cardan shaft. The power transmission between the pump motor and the pump part takes place preferably via a form-locking connection. For example, splines or a connection with a polygonal profile may be provided as the form-locking connection, wherein the intermediate shaft and the pump motor are connected to one another via this form-locking connection. An efficiency advantage results because the intermediate shaft arranged in articulated fashion does not transfer any forces into the bearing points of the pump motor and pump part because of an angular offset. Friction losses of the articulated mounting of the intermediate shaft are therefore negligible.

In the present invention, the housing has a receiver accessible from the outside, wherein the receiver is delimited by a mounting wall in the insertion direction. The pump motor can be arranged at least partially inside the receiver. The pump motor is here centered on the mounting wall. Advantageously, a gap which is also filled with oil remains between the outer periphery of the pump motor and the receiver, so that the pump motor is cooled peripherally. The mounting wall in particular has connecting openings so that the receiver, and where applicable in particular the gap around the pump motor, are also in fluidic connection with the oil chamber of the transmission.

The pump part can be mounted on the mounting wall from the inside. The pump part is preferably bolted to the housing. The hydraulic pump part is fixed and integrated in the transmission chamber so as to be inaccessible from the outside. The pump part and the pump motor are advantageously centered on the mounting wall via a common seat.

The proposed oil pump also has the advantage that no rotational seal abuts against the intermediate shaft and thus friction losses are avoided. Preferably, there is no contact seal at the bearing points of the pump motor. Because the corresponding mounting wall is also situated in the oil chamber, no seals are required here.

A control unit is connected to the head of the pump motor, in particular by screw connection. The control unit lies at least partially outside the receiver and thus also outside the clutch housing. The receiver is closed by the control unit. The control unit seals against the receiver. The housing of the control unit may engage in the receiver of the clutch housing and be connected in a sealed fashion to the corresponding housing region.

The pump motor and the control unit are connected by at least an electrical line, in particular at least by a three-phase line. Furthermore, an oil seal of these electrically conductive lines is provided at the transfer point between the control unit housing and the pump motor housing, e.g. by an encapsulating potting or sealing compound.

The internal combustion engine and the transmission are mounted transversely in the frontal region of the motor vehicle. The transmission is preferably configured as a dual clutch transmission. The oil pump is preferably arranged in the vicinity of a differential gear. The oil pump is in particular arranged below the differential gear. The oil pump can thus be arranged close to a suction filter. The rotor shaft of the pump motor extends in particular parallel to the axle shafts of the differential gear.

After mounting of the control unit, the control unit is arranged on the clutch housing in the region of a front axle drive or a front axle transverse differential lock or an angle gear drive for all-wheel drive vehicles. In the case of all-wheel drive vehicles or vehicles with transverse differential lock, this has the advantage that no heat transport takes place. If further ancillary units are not fitted e.g. in the standard frontal mounting system, the control unit may be exposed to the heat of the exhaust system. Heat dissipation or cooling of the control unit may therefore take place via a correspondingly solid bolting of the control unit to the clutch housing or alternatively via a superficial contact or surface contact of the control unit with the clutch housing.

The oil pump can be the sole pressure supply source of the transmission, in particular for transmissions with relatively small oil demands e.g. automated transmissions with a dry clutch or dual clutch.

In another advantageous variant, the oil pump configuration of the motor vehicle transmission has a main oil pump which is functionally actively driven by the internal combustion engine, and the oil pump is operated as an additional oil pump. The additional oil pump is preferably integrated in the hydraulic circuit and circuit diagram such that an existing mechatronic concept need only be changed slightly. The hydraulic circuit is preferably configured such that in one switch position of a switchover valve, the additional oil pump supplies pressurized oil to the mechatronic unit, and in another switch position of the switchover valve also, advantageously, can directly feed a cooling oil branch, in particular for the clutch, preferably the dual clutch. The cooling oil supply requires only a lower pressure than the main system pressure. Thus it is possible at a high system main pressure of e.g. 10 bar, to nevertheless provide large cooling oil quantities at a small pressure of e.g. less than 3 bar. This is advantageous in particular in driving situations such as e.g. creeping forward on a hill or maneuvering with a trailer. Also, it is hereby possible to allow after-cooling of the clutch when the vehicle has stopped or is at idle. The cooling and the actuators may be supplied with oil volumes independently of each other due to the integration of the switchover valve. Because the switchover valve is provided, for identical system power, a smaller electric drive power of the pump motor need be provided. The smaller dimensioning of the pump motor has the advantage that the on-board network or power supply is not excessively loaded, precisely at low engine rotation speeds. The installation space of the pump motor is also hereby reduced. The pump motor and the control unit must thus absorb smaller heat quantities and on average are cooler, which also saves component costs.

The main oil pump driven by the internal combustion engine is preferably a vane pump. In order to prevent intake difficulties of the vane pump, the main oil pump may be charged by the additional oil pump before driving begins, for example after a driver's door has opened. Such a function can easily be implemented by the mechatronic unit. Preferably, a supply line is switchable through the use of the mechatronic unit, wherein the supply line connects the mechatronic unit to the main oil pump. In particular if no pressure and no cooling oil volume flow are required, then apart from system leakages, the entire oil volume flow of the additional oil pump reaches the intake tract of the main pump via the supply line. In the state when the intake tract is filled with oil, no intake difficulties then occur. The additional oil pump is preferably operated as an actuator of the control unit. The control unit of the oil pump is supplied with control signals and setpoint quantities via a transmission CAN (Controller Area Network) bus. In a preferred embodiment, the additional oil pump has an electrical voltage or power supply which is independent of the transmission control unit. Thus it is easily possible, for later applications, to convert the pump from e.g. 12 Volt to 48 Volt without having to change the transmission control unit.

The disadvantages cited initially are therefore avoided, and corresponding advantages are achieved.

There are now multiple possibilities for developing and refining the oil pump configuration according to the invention. For this, reference should be made firstly to the dependent claims. A preferred embodiment of the invention is explained in more detail below with reference to the drawing and the associated description.

Other features which are considered as characteristic for the invention are set forth in the appended claims.

Although the invention is illustrated and described herein as embodied in an oil pump configuration for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
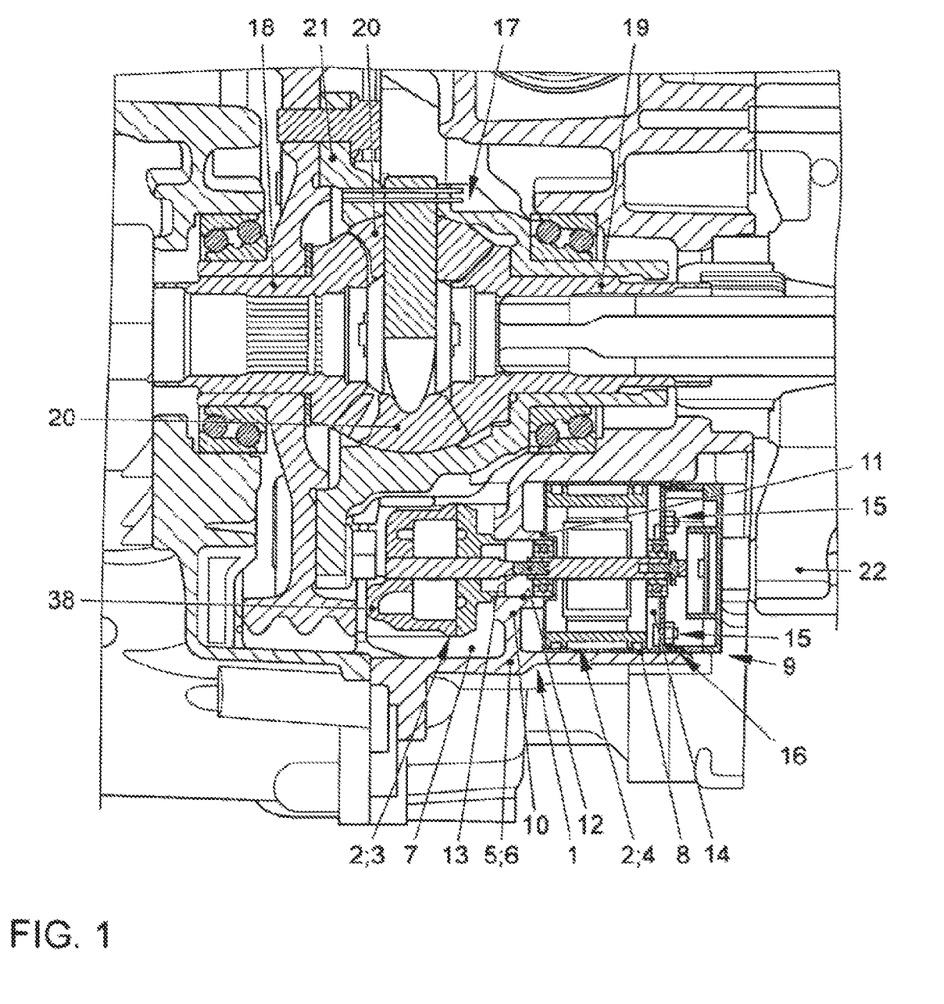
FIG. 1 is a diagrammatic cross-sectional view of an additional oil pump disposed on a clutch housing and an axle differential gear in accordance with the invention.
Figure 2:
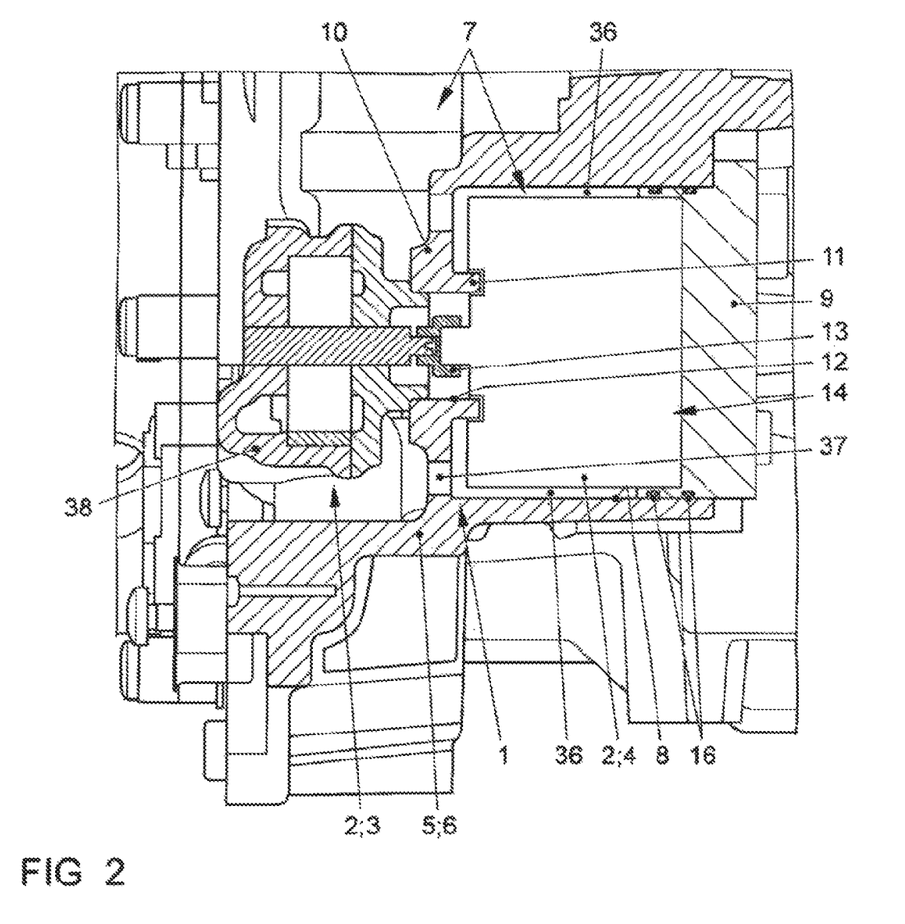
FIG. 2 is a diagrammatic, cross-sectional detailed view of the additional oil pump according to the invention.

Referring now to the figures of the drawing in detail and first, particularly, to FIGS. 1 and 2 thereof, there is shown an oil pump configuration 1 with an additional oil pump 2 for a transmission (not shown in detail) of a motor vehicle.

The additional oil pump 2 is integrated in a hydraulic circuit 26 or 27 (see FIG. 4 or 5), wherein the hydraulic circuits 26, 27 each include a main oil pump 28, wherein the main oil pump 28 is provided in parallel to the additional oil pump 2 (with the corresponding pump part 3 and pump motor 4). The pump part 3 is in particular configured as a gear pump. The pump part 3 may be configured as a gerotor pump, i.e. an annular gear pump, or as a crescent pump.

Before discussing the hydraulic circuits 26, 27 in detail, firstly the arrangement and configuration of the additional oil pump 2 will be explained with reference to FIG. 1 and FIG. 2.

The additional oil pump 2 has a hydrostatic pump part 3 and a pump motor 4. The pump part 3 can be driven by the pump motor 4 and is operatively connected to the pump motor 4. The pump part 3 and the pump motor 4 are mounted on a housing 5. The housing 5 is configured in particular as a clutch housing 6. The housing 5 delimits, i.e. bounds, an oil chamber 7.

The disadvantages cited initially are now avoided in that the pump part 3 can be mounted inside the housing 5, and the pump motor 4 can be mounted on the housing 5 from the outside. The housing 5 has a receiver (receptacle) 8. The pump part 3 is mounted from the inside on the housing 5, and the pump motor 4 with a control unit 9 is mounted from the outside in the receiver 8 on the housing 5. The drive unit is formed of the pump motor 4 and the control unit 9 and is arranged so as to be accessible from the outside for customer service and hence replaceable.

The housing 5 has a mounting wall 10. The mounting wall 10 has a seat 11 protruding into the receiver. The pump motor 4 is centered on the seat 11. The seat 11 surrounds a passage opening 12. Furthermore, on the other side of the mounting wall 10, in the interior, the pump part 3 is centered on the passage opening 12. The seat 11 and the passage opening 12 are formed centrally on the mounting wall 10. The passage opening 12 is in particular formed cylindrical and extends coaxially to a virtual pump axis (not shown) of the additional oil pump 2. The passage opening 12 and the seat 11 allow a common centering of the pump part 3 and the pump motor 4.

The mounting wall 10 has openings 37 so that oil can enter the receiver 8. The receiver 8 therefore also forms part of the oil chamber 7. The pump motor 4 is situated inside the oil chamber 7. A gap 36 remains between the pump motor 4 and the receiver 8. Through this gap, the pump motor 4 can be cooled by the corresponding oil (not shown) on the outer periphery.

An intermediate shaft 13 is provided (see FIG. 2), wherein the intermediate shaft 13 connects the pump part 3 and the pump motor 4 to one another through the passage opening 12. The intermediate shaft 13 is integrated captively in the pump part 3. The power is transmitted between the pump motor 4 and the pump part 3 via splines or a polygonal profile (not shown in detail) or alternatively via another form-locking connection. The intermediate shaft 13 is preferably not mounted fixedly and may therefore compensate for angular defects or angle errors between the pump motor 4 and the pump part 3 in the manner of a cardan shaft.

The control unit 9 is arranged on the head 14 of the pump motor 4. The control unit 9 is in particular connected to the pump motor 4. Preferably, a screw connection 15 is provided (see FIG. 1) which connects the control unit 9 to the pump motor 4. The control unit 9, in particular a corresponding housing (not shown in detail) of the control unit 9, is now used to seal the receiver 8 of the clutch housing 6 against the environment. For this, the control unit 9 protrudes at least partially into the receiver 8 and lies sealing against the inner periphery of the receiver 8 through the use of corresponding seals 16. The control unit 9—in contrast to the pump motor 4—lies partially outside the clutch housing 6. The seals 16 could in particular be formed as O-rings. Alternatively, shaped sealing rings or a multi-lip seal could be used as seals 16 in order to seal the control unit 9 against the receiver 8. Furthermore, a drive-internal oil seal is provided to seal the control unit 9 against the pump motor 4 around which oil flows. For this, in particular electrically conductive three-phase lines are sealed by a potting compound or sealing compound from the pump motor 4. In particular, the compound may be a glass potting or glass sealing compound.

As clearly evident from FIG. 1, the additional oil pump 2 is here arranged in the region of a differential gear 17. The differential gear 17 has in particular two axle shafts 18, 19 which are operatively connected via corresponding differential pinions 20. The differential pinions 20 are mounted correspondingly rotatably on a driven differential housing 21. The pump part 3 and the pump motor 4 are arranged in or on the clutch housing 6 in the vicinity of the differential gear 17. The axis of this system, including the pump part 3 and the pump motor 4, lies below the middle of the differential gear 17, as close as possible to the suction filter (not shown). This system axis is planar-parallel to the corresponding axis of the axle shafts 18, 19. However, a totally different orientation of the axis of the additional oil pump 2 is possible.

The installation space of the pump part 3 intersects with supporting structures, namely a corresponding rib formed on the inside of the clutch housing 6. The pump part 3 preferably has a supporting function and transmits corresponding loads without leading to a deformation in the gear set (not shown in detail) of the pump part 3. The housing 5 has a rib (not shown in detail), wherein the rib has a cutout in the region of the pump part 3, wherein the pump part 3 bridges the cutout and thus performs the reinforcement function of the rib in this region. The pump part 3 has a pump housing 38. The pump housing 38 is configured such that the necessary supporting function of the rib is performed by the pump housing 38. The structure is selected such that the loads to be transferred lead at most to slight deformations in the pump housing 38, namely of the corresponding gear set. The pump housing 38 is connected via three bolts to the clutch housing 6. The hydraulic part of the additional oil pump 2—namely the pump part 3—is integrated in the transmission chamber so as to be inaccessible from the outside.

The control unit 9 is formed in particular curved or "banana-shaped", and thus surrounds in arcuate fashion the region of the differential gear 17 shown on the right in FIG. 1. The control unit 9 is here arranged in the region of the interface for the front axle drive or front axle transverse differential lock. When these assemblies are installed, the control unit 9 is arranged between the housing 22 of the front axle drive and the housing 5. In all-wheel drive vehicles or vehicles with transverse differential lock, no excessive heating occurs. If these ancillary assemblies are not fitted, the control unit 9 could be exposed to the heat of the exhaust system. The heat is therefore dissipated from the control unit 9 via solid bolting to the clutch housing 6, or alternatively via a superficial contact or surface contact of the control unit 9 with the clutch housing 6. This electrically driven additional oil pump 2 can be integrated in the existing installation space in a dual clutch transmission DKG installed transversely (see FIG. 3). With a maximum power consumption of the additional oil pump 2 of 300 Watt, in particular cooling oil quantities of up to 15 liters per minute can be provided.

Figure 3:
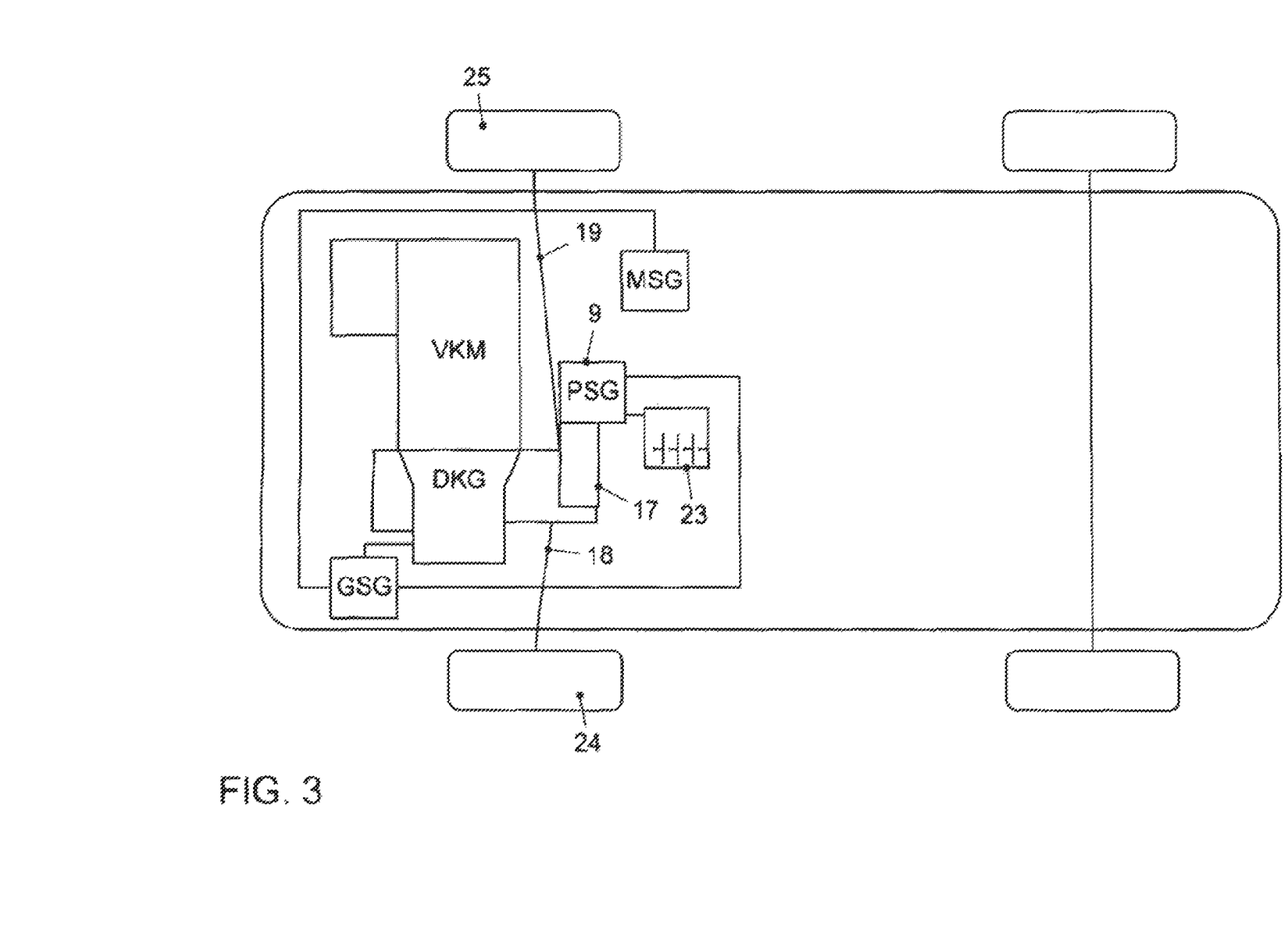
FIG. 3 is a highly schematic view of a motor vehicle with an internal combustion engine and a dual clutch transmission in accordance with the invention.

FIG. 3 shows an internal combustion engine VKM and a dual clutch transmission DKG. The dual clutch transmission DKG is controlled or regulated by a transmission control unit GSG. The transmission control unit GSG is connected to an engine control unit MSG via a drive CAN bus (CAN=controller area network). The transmission control unit GSG is connected to the pump control unit 9/PSG via a transmission CAN bus. The pump control unit 9/PSG is connected to a power or voltage source 23. This voltage source 23 can, as shown, work with 12 Volt or, in an alternative configuration, provide 48 Volt for example. The power supply 23 is independent of a power supply of the transmission control unit GSG. Thus for later applications, it is easily possible to convert the additional oil pump 2 from e.g. 12 Volt to 48 Volt, without having to change the transmission control unit GSG. The pump motor 4 is operated as an actuator of the transmission control unit GSG and supplied with control signals and setpoint quantities by the transmission CAN bus.

The additional oil pump 2 is not shown in detail in FIG. 3 but is here however arranged below the differential gear 17, wherein the two axle shafts 18, 19 depart from the differential gear 17 and drive the corresponding drive wheels 24, 25. The internal combustion engine VKM and the dual clutch transmission are installed transversely in the frontal region of the motor vehicle.

Figure 4:
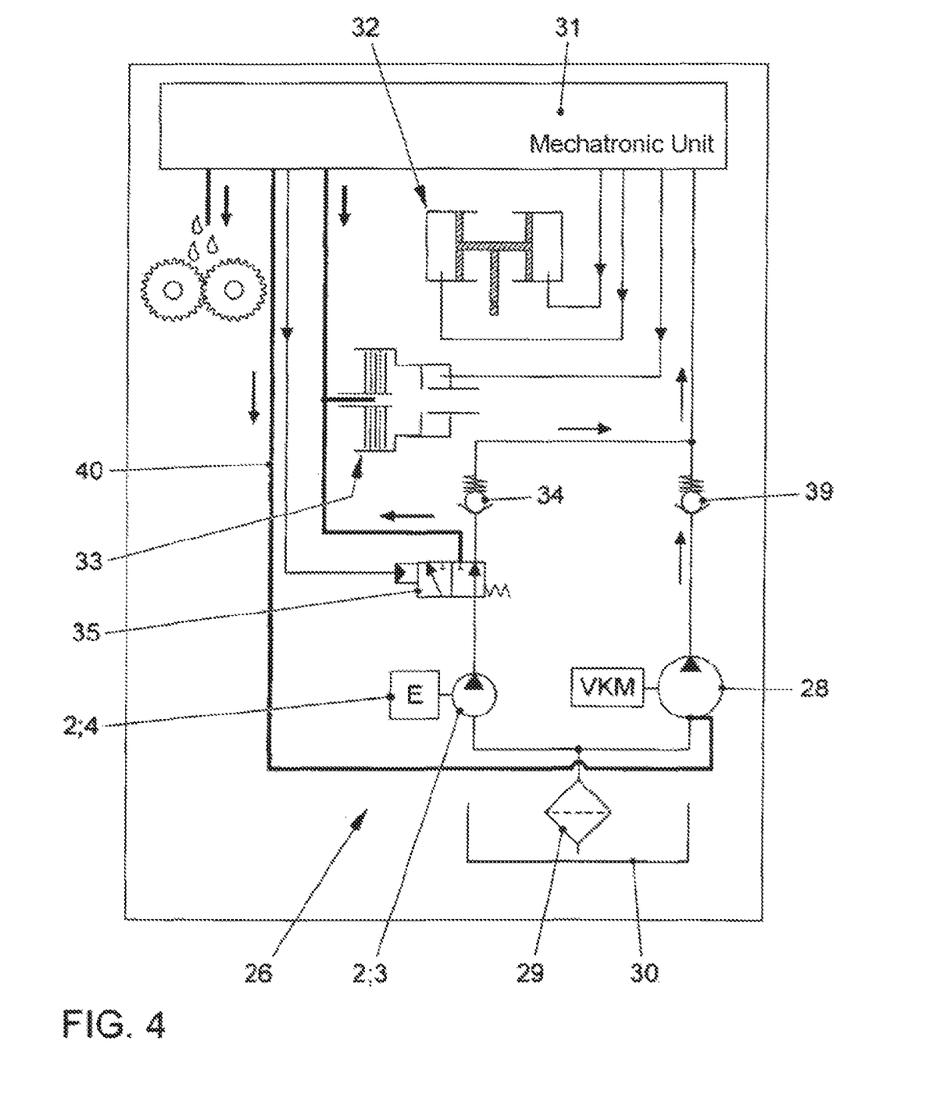
FIG. 4 is a diagrammatic view of a first hydraulic circuit with the additional oil pump and a main oil pump in accordance with the invention.

In the description which follows, the two hydraulic oil circuits 26, 27 are described with reference to FIGS. 4 and 5:

The hydraulic oil circuits 26, 27 firstly each have a main oil pump 28, wherein the respective main oil pump 28 is provided parallel to the additional oil pump 2 with the corresponding pump part 3 and pump motor 4. The main oil pump 28 and the additional oil pump 2 deliver corresponding transmission oil via a suction filter 29 from a transmission oil sump 30. The main oil pump 28 supplies a mechatronic unit 31. From the mechatronic unit 31, corresponding actuators 32 or also the clutch 33 are supplied with pressurized oil. Furthermore, via the mechatronic unit 31, cooling oil or lubricating oil is supplied to the transmission, as depicted by the two pinions on the left in FIGS. 4 and 5. The additional oil pump 2 now delivers corresponding oil to the mechatronic unit 31, in parallel to the main oil pump 28. A check valve 34 is provided between the mechatronic unit 31 and the additional oil pump 2. In one embodiment, the check valve 34 is arranged inside the housing 5. Alternatively, the check valve 34 may be integrated in the mechatronic unit 31.

Furthermore, a check valve 39 is provided downstream of the main oil pump 28. If only the additional oil pump 2 is delivering, and not the main oil pump 28, the check valve 39 blocks the delivery flow of the additional oil pump 2 against the main oil pump 28 so that the delivery flow is conducted to the mechatronic unit 31. The flow through the main oil pump 28 against the delivery direction is suppressed by the check valve 39. In one embodiment, the check valve 39 is arranged inside the housing 5. The check valve 39 may be integrated in the main oil pump 39. Alternatively, the check valve 39 may be integrated in the mechatronic unit 31.

Figure 5:
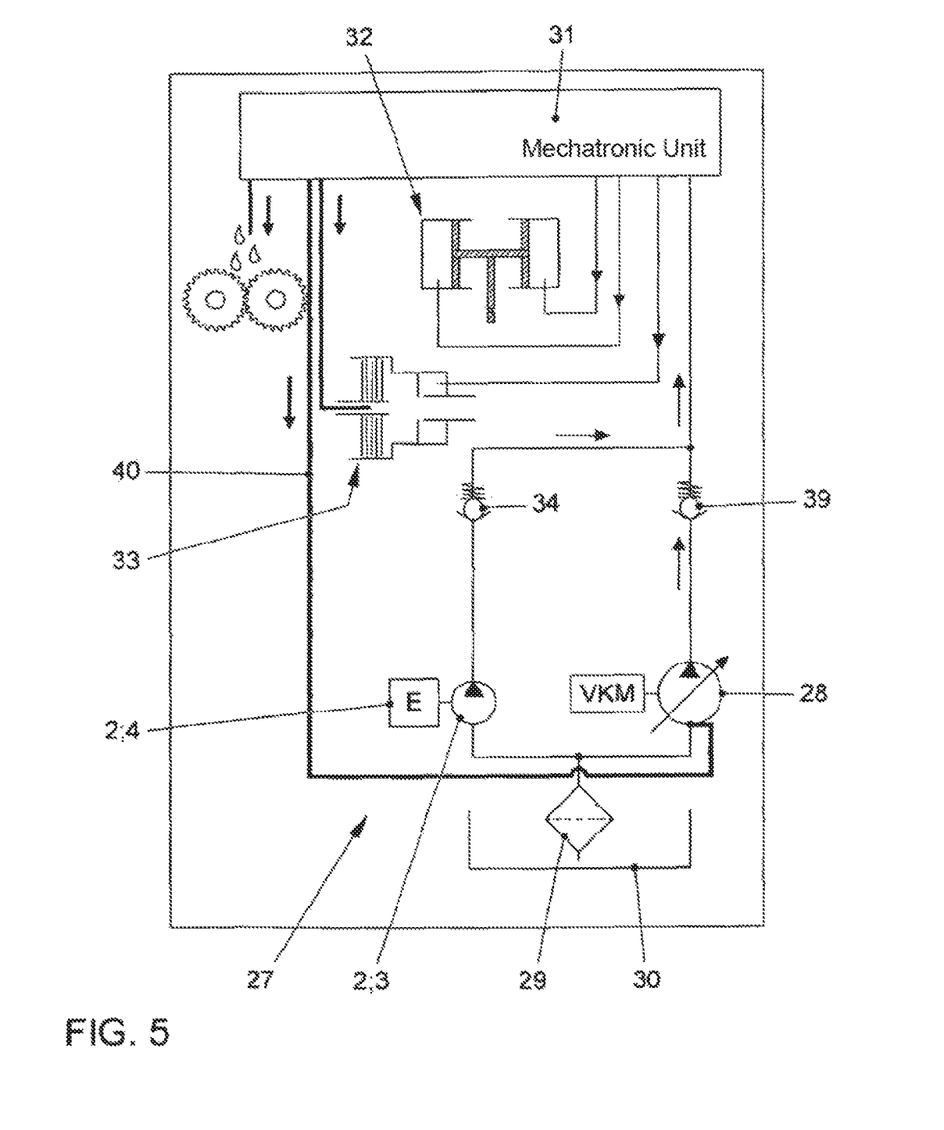
FIG. 5 is a highly diagrammatic view of a further hydraulic circuit with the main oil pump and the additional oil pump according to the invention.

In the embodiment shown in FIG. 5, the main oil pump 28 is adjustable. This ensures that, even at low rotation speeds of the internal combustion engine VKM, sufficient cooling oil is still available. In the embodiment shown in FIG. 4, the main oil pump 28 is configured as a constant pump. A valve 35 is now arranged downstream of the additional oil pump 2, between the additional oil pump 2 and the check valve 34. Through the use of this valve 35, it is possible to provide cooling oil below the main pressure. The valve 35 may be controlled via an electrical precontrol valve in the mechatronic unit 31. Alternatively, the valve 35 may be controlled directly. The valve 35 may be arranged inside the housing 5. In an alternative embodiment, the valve 35 may be integrated in the mechatronic unit 31. The main oil pump 28 is configured as a constant oil pump and has a large displacement volume. Thus an adequate oil supply is guaranteed in every operating situation.

In particular, the motor vehicle has a start-stop system. Since the main oil pump 28 does not deliver when the internal combustion engine is not running, the additional oil pump 2 is now provided. In this way, in particular a start-stop system is conceivable even at more than 2 km/h and coasting of the motor vehicle with the internal combustion engine VKM switched off. Due to the arrangement of the additional oil pump 2, the system is robust. Furthermore, due to the additional oil pump 2, even with longer stoppage times and a start-stop system, it is guaranteed that the system pressure can be built up sufficiently quickly. Furthermore, the additional oil pump 2 can increase the overall efficiency in the drive train. In particular, losses from the provision of hydraulic auxiliary energy for actuation and for cooling and lubricating purposes can be reduced. No additional hydraulic accumulator is integrated in the corresponding hydraulic circuits 26, 27. The main oil pump 28 may for example be designed smaller, since extreme situations can be compensated by powering of the additional oil pump 2. In particular, with the proposed additional oil pump 2, start-stop functionalities can be provided even at higher speeds of e.g. 7 km/h, or coasting of the motor vehicle with the internal combustion engine VKM switched off. Due to the additional oil pump 2, hydraulic energy in the form of a pressurized oil supply or lubricating oil supply can be provided even when the motor vehicle has stopped.

The main oil pump 28 may be configured as a vane pump. The additional oil pump 2 may now be used to compensate for intake difficulties of the vane pump or main oil pump 28. For example, the main oil pump 28 may be charged by the additional oil pump 2, wherein the mechatronic unit 31 is connected via an additional supply line 40 to the intake tract of the main oil pump 28. The supply line 40 preferably opens into a suction manifold (not shown) of the main oil pump 28. Preferably, the supply line 40 is switchable through the use of the mechatronic unit 31. Charging of the main oil pump 28 is thus ensured by the mechatronic unit 31. If no pressurized oil and no cooling oil volume flow are required, then apart from system leakages, the entire oil volume flow of the additional pump 2 flows via the additional supply line 40 into the intake tract of the main oil pump 28. When the intake tract of the main oil pump 28 is in the oil-filled state, no intake difficulties occur.

LIST OF REFERENCE CHARACTERS

1 Oil pump configuration
2 Additional oil pump
3 Pump part
4 Pump motor
5 Housing
6 Clutch housing
7 Oil chamber
8 Receiver
9 Control unit
10 Mounting wall
11 Seat
12 Passage opening
13 Intermediate shaft
14 Head
15 Screw connection
16 Seal 17 Differential gear
18 Axle shaft
19 Axle shaft
20 Differential pinion
21 Differential housing
22 Housing (front wheel axle drive)
23 Power supply
24 Drive wheel
25 Drive wheel
26 Hydraulic circuit
27 Hydraulic circuit
28 Main oil pump
29 Suction filter
30 Gear oil sump
31 Mechatronic unit
32 Actuator
33 Clutch
34 Check valve
35 Valve
36 Gap
37 Openings
38 Pump housing
39 Check valve
40 Supply line
VKM Internal combustion engine
DKG Dual clutch transmission
GSG Transmission control unit
PSG Pump control unit
MSG Engine control unit

What is claimed is:

1. An oil pump configuration for a motor vehicle transmission, comprising:
   an oil pump having a pump part and an electric pump motor, said pump part being operatively connected to said electric pump motor;
   a housing, said housing at least partially delimiting an oil chamber, said pump part being mountable inside said housing, said electric pump motor being mountable on said housing from outside;
   a control unit disposed on said electric pump motor;
   said control unit being sealed against said electric pump motor;
   said housing having a receiver;
   said electric pump motor engaging at least partially in said receiver; and
   said control unit being sealed against said receiver by at least a seal.

2. The oil pump configuration according to claim 1, wherein said oil pump is disposed at a differential gear of the motor vehicle transmission.

3. The oil pump configuration according to claim 1, wherein said pump part is bolted to said housing such that said pump part performs a reinforcing function for said housing.

4. The oil pump configuration according to claim 1, wherein said oil pump has an electrical power supply which is independent of a transmission control device.

5. The oil pump configuration according to claim 1, wherein said housing is configured as a clutch housing.

6. The oil pump configuration according to claim 5, wherein said clutch housing forms a part of a transmission casing and at least partially seals said transmission casing.

7. The oil pump configuration according to claim 5, wherein said clutch housing at least partially seals a transmission casing.

8. An oil pump configuration for a motor vehicle transmission, comprising:
   an oil pump having a pump part and an electric pump motor, said pump part being operatively connected to said electric pump motor;
   a housing, said housing at least partially delimiting an oil chamber, said pump part being mountable inside said housing, said electric pump motor being mountable on said housing from outside;
   an intermediate shaft disposed in an articulated manner; and
   said pump part and said electric pump motor being joined to one another via said intermediate shaft.

9. The oil pump configuration according to claim 8, wherein:
   said housing has a receiver; and
   said electric pump motor engages at least partially in said receiver.

10. The oil pump configuration according to claim 9, wherein:
    said housing has a mounting wall delimiting said receiver;
    said mounting wall is formed with a passage opening; and
    said pump part is centered on an inner side of said mounting wall and said electric pump motor is centered on an outer side of said mounting wall.

11. The oil pump configuration according to claim 8, wherein:
    a control unit is disposed on said electric pump motor; and
    said control unit is sealed against said electric pump motor.

12. The oil pump configuration according to claim 11, wherein:
    said housing has a receiver;
    said electric pump motor engages at least partially in said receiver; and
    said control unit is sealed against said receiver by at least a seal.

13. An oil pump configuration for a motor vehicle transmission, comprising:
    an oil pump having a pump part and an electric pump motor, said pump part being operatively connected to said electric pump motor;
    a housing, said housing at least partially delimiting an oil chamber, said pump part being mountable inside said housing, said electric pump motor being mountable on said housing from outside; and
    a main oil pump functionally actively driven by an internal combustion engine, said main oil pump being provided parallel to said oil pump in a hydraulic oil circuit, wherein an intake tract of said main oil pump can be charged by said oil pump.

14. The oil pump configuration according to claim 13, including:
    an intermediate shaft disposed in an articulated manner; and
    said pump part and said electric pump motor being joined to one another via said intermediate shaft.

15. The oil pump configuration according to claim 13, including a switchover valve provided downstream of said oil pump, wherein in one switch position of said switchover valve, said oil pump feeds a mechatronic unit and in another switch position of said switchover valve, said oil pump feeds a cooling oil branch, wherein said mechatronic unit is configured to perform an oil flow control.

16. An oil pump configuration for a motor vehicle transmission, comprising:
    an oil pump having a pump part and an electric pump motor, said pump part being operatively connected to said electric pump motor;

a housing, said housing at least partially delimiting an oil chamber, said pump part being mountable inside said housing, said electric pump motor being mountable on said housing from outside; and a switchover valve provided downstream of said oil pump, wherein in one switch position of said switchover valve, said oil pump feeds a mechatronic unit and in another switch position of said switchover valve, said oil pump feeds a cooling oil branch, wherein said mechatronic unit is configured to perform an oil flow control.

17. The oil pump configuration according to claim 16, including a main oil pump functionally actively driven by an internal combustion engine, said main oil pump being provided parallel to said oil pump in a hydraulic oil circuit.

18. The oil pump configuration according to claim 17, wherein an intake tract of said main oil pump can be charged by said oil pump.

* * * * *